Oct. 18, 1927.
F. W. CONANT
1,646,054
REAMING APPARATUS
Filed June 1, 1926
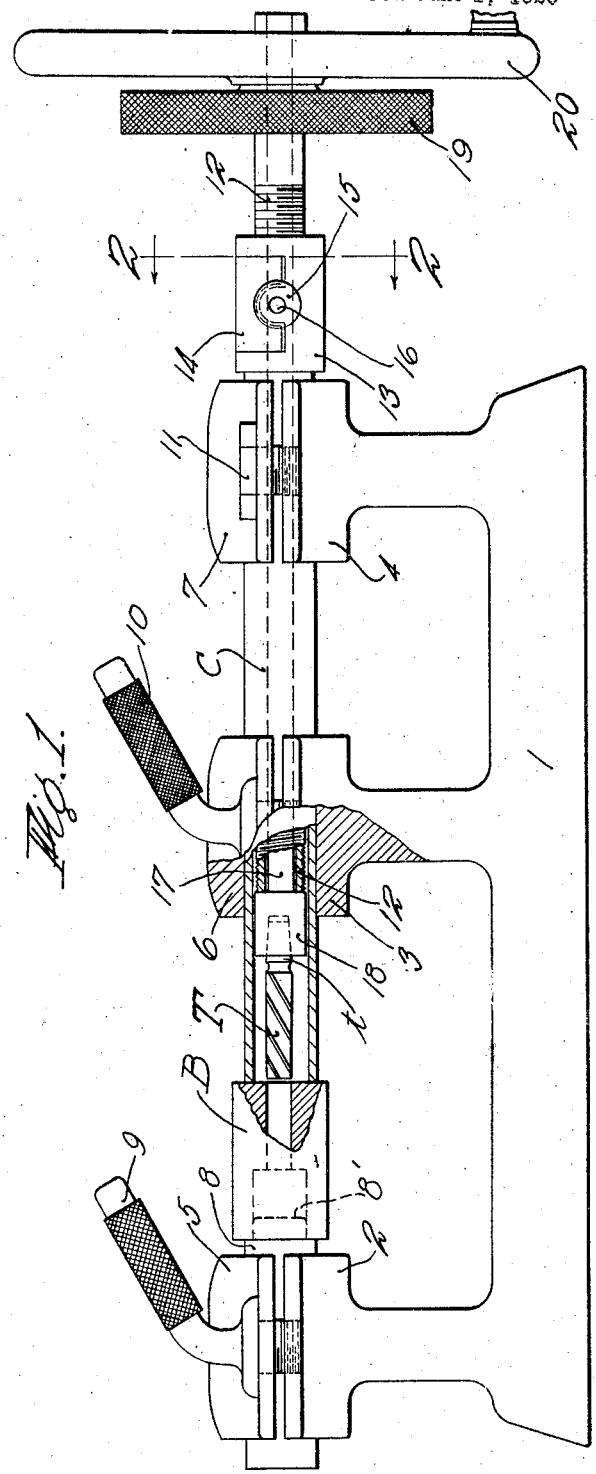
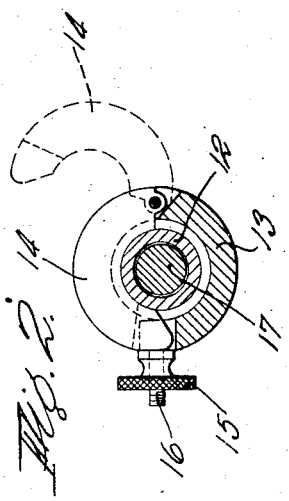
INVENTOR.
Frederick W. Conant
BY Chapin & Neal
ATTORNEYS.

Patented Oct. 18, 1927.

1,646,054

UNITED STATES PATENT OFFICE.

FREDERICK W. CONANT, OF CONWAY, MASSACHUSETTS.

REAMING APPARATUS.

Application filed June 1, 1926. Serial No. 112,855.

This invention relates to improvements in boring or reaming apparatus and is directed more particularly to apparatus of the so-called "bench" type adapted for boring and reaming such relatively small work as bushings, bearings, connecting rods or the like.

In garages, repair shops and the like which are not usually equipped with machine tools, it is common practice when reaming or boring small parts to clamp the work in a vice and to rotate a boring tool or reamer by means of a wrench, bit brace or other tool and at the same time bear on or exert end pressure on the tool to feed it through the part being bored or reamed. This method offers disadvantages in that it does not tend to produce satisfactory results for the reasons that the clamping of the work distorts it and the tool can not be properly guided with respect thereto so that it is practically impossible to produce a straight, concentric hole.

To overcome these objections, according to one novel feature of my invention I provide an apparatus in which the work is clamped in such a way as not to distort it and the tool is accurately guided in respect thereto to produce a straight and perfectly concentric hole.

According to another feature of the invention, I provide an apparatus in which the tool may be fed into work at any desired rate of feed without the tendency to throw the tool out of axial alignment and is accomplished by guiding the tool in the clamp and providing means for exerting end pressure to the tool as it is guided therealong.

According to a further feature of the invention, I provide an apparatus which is simple in construction and therefore economical to manufacture which, together with a compact design, provides an apparatus which lends itself readily to the peculiar requirements of garages, repair shops and the like.

Other novel features and advantages will be apparent from the following description of the invention which is illustrated in the form at present preferred by means of the accompanying drawings, in which:

Fig. 1 is a side elevational view of the apparatus with certain of the parts partly in section for clearness; and Fig. 2 is a cross sectional elevational view taken on the line 2—2 of Fig. 1.

Referring to the drawings in detail, a base or bed plate is represented at 1 which may be provided with fastening lugs or apertures therethrough for receiving bolts for conveniently securing the apparatus to a bench or the like. Bearings 2, 3 and 4 on the upper side of the base and caps 5, 6 and 7 which are removably secured thereto by means of clamping bolts or screws 9, 10 and 11 form clamping bearings for receiving a mandrel 8 and a clamp C.

The mandrel 8 is slidable in the bearings 2 and is arranged to be moved relative thereto into various positions of adjustment, and held in such positions by means of the clamping cap as shown. This mandrel may take any form desired such, for instance, as a collet for centering a piece of work or any other form most convenient for abutting and supporting the work in an aligned relation for the action of a boring or reaming tool. In the form shown, the mandrel is provided with a reduced portion 8′ for fitting within a recess of a bushing B of particular shape and is adapted to center or align the bushing as well as to abut the rear end thereof to support the same against the pressing action of the clamp C.

The clamp C is preferably in the form of a hollow shaft or tube and is slidable in the bearings 3 and 4, whereby in operation it may be moved forwardly or towards the mandrel and work so that its forward end will abut the work B and force the same against the mandrel to clamp the work in properly aligned position for the reaming operation. When in clamping position either one or both of the caps 6 and 7 may be tightened by their screws to lock the clamp in its clamping position. A feed member 12, which for convenience will be called a feed screw, preferably in the form of a hollow tube is provided with an external screw thread and is slidable within the hollow clamp C and is normally free for a rotary movement therein except for the interengaging means associated with the clamp and feed member now to be described. A hub 13 fixed on the rear end of the clamp has an internally threaded nut 14 pivoted thereto which is adapted to be moved into or out of threaded engagement with the threads of the feed screw member 12. A locking member in the form of a knurled nut 15 in threaded engagement with a screw stud 16 carried by the hub is arranged to press against and to hold the nut 14 in engagement with the screw 12 when desired or when loosened it will allow the nut to be swung away from engagement with the screw. As previously stated, the screw is normally movable within the clamp, but for certain purposes the screw and clamp are brought into threaded engagement by the means just described. Any other means than that shown and described may be employed that is adapted for throwing the clamp and screw into or out of engagement when desired.

A tool driving shaft 17 rotatable within the feed member has a collar 18, preferably cylindrical, on its forward end which is provided with a socket adapted for receiving the shank $t$ of a reamer or other boring tool, represented at T. The tool T may take any form desired depending upon the work to be done although for illustrative purposes I have shown a reaming tool of ordinary form for reaming the bore of the bushing B. The tool T and the socket of the collar will preferably be formed so that there will be no relative turning action thereof whereby the tool may be positively rotated by a rotation of the tool shaft 17. It will be noted that the parts are so arranged that the forward end of the feed screw member will engage the rear side of the collar 18 so that a forward movement of the feed screw will feed the tool forwardly.

A knurled disc 19 fixed to the outer end of the feed screw 12 is provided for rotating the screw for feeding movements and a hand wheel 20 is likewise fixed to the outer end of the shaft 17 for rotating said shaft to drive or rotate the tool.

In operation, when it is desired to clamp the work to hold it for the reaming operation, the feed screw nut 14 is thrown from engagement with the feed screw and the caps 6 and 7 are loosened so that the clamp and feed screw may be moved independently of one another. The clamp C is then moved forwardly in the bearings to engage and clamp the work against the mandrel 8 and is then fixed in its clamping position by tightening the caps 6 and 7. With a tool such as T in the socket of the collar of the shaft, the feed screw and shaft are moved forwardly and relative to the clamp until the tip of the tool is about to enter the hole of the work. When in this position, the feed screw nut 14 is swung downwardly to engage the screw and thereby connect the screw and clamp in screw threaded engagement; that is, its threads will engage those of the screw so that the screw may be screwed forwardly in the clamp and the nut may be locked in place by the locking member 15. A rotation of the screw in the proper direction by means of the disc 19 will, since it is now in threaded engagement with the clamp, move it forwardly of the clamp and its forward end acting on the collar of the tool shaft will feed the shaft and tool into the work. The tool shaft 17 is rotated by means of the wheel to rotate the tool at any speed desired for the reaming operation.

The tool shaft 17 and feed screw 12 may be rotated at any desired relative speeds so that the feeding movement thereof may be most suitable for the particular tool or work employed. When the reaming or boring operation is completed, the caps 6 and 7 are loosened to permit a rearward movement of the clamp to release the work and the nut 14 is disengaged from the feed screw 12 so that the tool may be moved rearwardly with respect to the clamp.

From the foregoing, it will be observed that I have provided a reaming apparatus having means for clamping the work and for guiding a tool in respect thereto and that the means for feeding the tool is arranged for engagement with the clamp whereby the tool may be carried by the clamp or moved relative thereto for the reaming operation.

I am aware that in practice the form of the invention may be varied from that shown and described without departing from the novel features thereof, and I prefer therefore to be limited by the appended claims rather than by the foregoing description of the invention.

What I claim is:

1. An apparatus of the class described comprising in combination, relatively movable work clamping members for supporting work, a rotatable tool guided in one of said members adapted for reciprocating movements relative thereto, means associated with said tool and clamp for feeding the tool relative thereto in step by step movements as the tool is rotated with respect to the clamp.

2. An apparatus of the class described comprising in combination, relatively movable work clamping members for supporting work, a hollow feed screw rotatable and reciprocable therein, a tool shaft rotatable in said screw, and means associated with said screw and clamp for connecting them in screw threaded engagement whereby the tool is fed thereby relative to said clamp.

3. An apparatus of the class described comprising in combination, a support for a piece of work, a clamp movable relative thereto, for clamping work against said support, a rotatable tool guided in said clamp for movements towards and away from said support, a rotatable feed member in said clamp for feeding said tool, and means associated with said clamp and member for engaging one with the other whereby a rotation of said member will move it relative to said clamp and thereby feed the tool as it is being rotated.

4. An apparatus of the class described comprising in combination, a support for centering a piece of work, a clamp movable relative thereto for clamping work against said support, a rotatable tool guided in said clamp for movements towards or away from said support, a rotatable feed member in said clamp for feeding said tool and means associated with said clamp and member for engaging one with the other whereby a rotation of said member will move it relative to said clamp and thereby feed the tool as it is being rotated.

5. An apparatus of the class described comprising in combination, a support for centering a piece of work, a clamp movable relative thereto for clamping work thereagainst, a feed screw normally slidable and rotatable with respect thereto, a tool rotatable with respect to said clamp and screw adapted to be moved axially by said screw, a threaded member carried by said clamp adapted to engage the threads of said screw so that a rotation of the screw will move the tool with respect to said clamp.

6. An apparatus of the class described comprising in combination, a support for a piece of work, a hollow clamp movable relative thereto for clamping work thereagainst, a hollow feed screw normally slidable and rotatable therein, a tool rotatable in said screw and arranged to be moved axially thereby, a threaded member carried by said clamp adapted to be moved into engagement with said screw so that a rotation thereof will move said tool axially with respect to said clamp.

7. An apparatus of the class described comprising in combination, a base, a support movable and adjustable therein, a hollow clamp movable and adjustable therein for clamping work against said support, a hollow feed screw normally slidable and rotatable in said clamp, a tool shaft rotatable in said screw having a tool socket in abutment with an end thereof whereby the shaft is moved axially of the clamp by the screw, a threaded member carried by said clamp adapted for movement into engagement with the threads of the screw so that a rotation of the screw relative to the clamp will move the shaft axially thereof.

8. An apparatus of the class described comprising in combination, a base, a work support movable and adjustable therein, a hollow clamp in axial alignment with said support movable and adjustable in said base for clamping work against said support, a hollow feed screw normally in non-threaded engagement with said clamp, a tool shaft rotatable in said screw provided with a tool socket in abutment with an end of said screw whereby the shaft may be fed axially of the clamp by an axial movement of the screw, a threaded member movable on said clamp adapted for engagement with the threads of the feed screw so that a rotation thereof will feed the said screw and shaft axially of the clamp.

In testimony whereof I have affixed my signature.

FREDERICK W. CONANT.